United States Patent [19]

Kits van Heyningen

[11] 4,161,629

[45] Jul. 17, 1979

[54] COMMUNICATION SYSTEM WITH SELECTABLE DATA STORAGE

[75] Inventor: Arent H. Kits van Heyningen, Newport, R.I.

[73] Assignee: Raytheon Company, Lexington, Mass.

[21] Appl. No.: 875,702

[22] Filed: Feb. 6, 1978

[51] Int. Cl.² .............................................. H04J 3/16
[52] U.S. Cl. .......................... 179/15 BA; 179/15 AV
[58] Field of Search .......... 179/15 AC, 15 A, 15 AV, 179/15 BA

[56] References Cited

U.S. PATENT DOCUMENTS

| Re. 29,215 | 5/1977 | Carney et al. | 179/15 BA |
|---|---|---|---|
| 3,306,979 | 2/1967 | Ingram | 179/15 BA |
| 3,591,722 | 7/1971 | Palsa | 179/15 BA |
| 3,633,172 | 1/1972 | Eggimann et al. | 179/15 BA |
| 3,641,273 | 2/1972 | Herold et al. | 179/15 BA |
| 4,063,038 | 12/1977 | Kaul et al. | 179/15 BA |

*Primary Examiner*—Thomas A. Robinson
*Attorney, Agent, or Firm*—David M. Warren; Joseph D. Pannone; Milton D. Bartlett

[57] ABSTRACT

A communication system for coupling a set of sending stations to a set of listening stations by means of a single communication link employing time compression multiplexing of the messages transmitted from individual ones of the sending stations. A predetermined number of time slots is provided for each of sequentially occurring scans of the sending stations, each slot providing for the transmission of a preset number of data samples. CCD registers are employed with switching circuitry enabling the available slots to be assigned to stations in accordance with the average data rate of a message.

7 Claims, 7 Drawing Figures

COMMUNICATION SYSTEM WITH SELECTABLE DATA STORAGE

BACKGROUND OF THE INVENTION

Time division multiplex telephony systems have been utilized in the past to enable a plurality of sending stations to communicate via a single communication link to a plurality of listening stations. One exemplary system is shown in the U.S. Pat. No. 3,098,124, which issued in the name of C. B. Fisher on July 16, 1963, and discloses a set of tapped delay lines which are individually filled with their respective messages at a preset data rate as is determined by the spacing of output signal taps on the delay lines. A switch rapidly scans the taps of the delay lines sequentially, thereby sampling signals at all taps of all the delay lines. Then the samples provided by the switch are transmitted sequentially via the single communication link.

A problem arises in systems such as that disclosed in the aforementioned Fisher patent in that the message signal propagating through a delay line experiences dispersive phase shift and attenuation with the result that samples extracted from different taps differ in their respective waveforms. Thus, in a sequence of such samples, there is an apparent modulation of the waveform periodically with the scanning of the aforementioned switch. In addition, the scanning procedure does not permit the sharing of time slots allocated to one station by another station in the event that the one station is not in use while the other station has a greater quantity of data than the average of the stations, nor can data of differing data rates be accommodated.

SUMMARY OF THE INVENTION

The foregoing problems are overcome and other advantages are provided by a communication system having a set of sending stations and a set of listening stations and which, in accordance with the invention, utilizes shift registers, preferably registers built from charged coupled devices (CCD's), in each of the stations for storage of samples of the data to be communicated. The data samples are entered, or written, into the registers at any one of a plurality of selectable sampling frequencies, and read out of the registers at fixed rate. The fixed rate is much faster than the selectable sampling frequencies and is employed in the transmission of the data samples from the registers of the sending stations over a common communication link to corresponding registers of the listening stations. A multiplexing switch extracts the stored data samples sequentially from each of the registers having data therein. Control circuitry allocates differing numbers of data transmission time slots to a plurality of the shift registers in accordance with the data rates to be transmitted from each of the sending stations.

BRIEF DESCRIPTION OF THE DRAWINGS

The aforementioned aspects and other features of the invention are explained in the following description taken in connection with the accompanying drawings wherein.

DESCRIPTION OF THE PREFERRED EMBODIMENT

Figure 1:
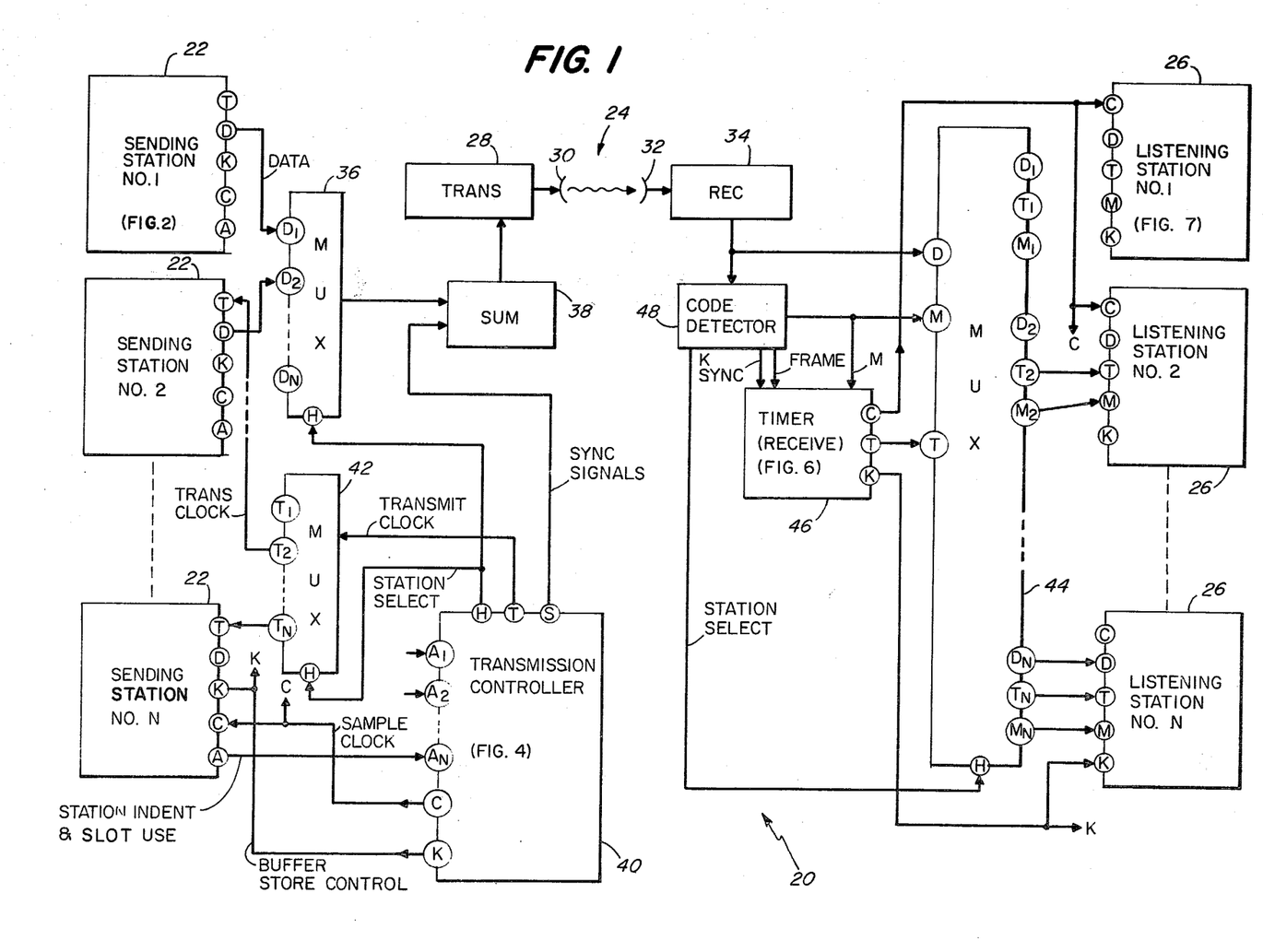
FIG. 1 is a block diagram of a communication system incorporating the invention for transmitting data from one or more sending stations of a set of sending stations over a common communication link to one or more corresponding listening stations in a set of listening stations.

Referring now to FIG. 1, there is seen a block diagram of a communication system 20 which, in accordance with the invention, comprises a set of sending stations 22 coupled by a common communication link 24 to a set of listening stations 26. The communication link 24 comprises a transmitter 28, a transmitting antenna 30 transmitting typically microwave radiation carrying data across the link 24, and a receiving antenna 32 coupled to a receiver 34 for receiving the data transmitted by the microwave link. The sending stations 22 are connected to the transmitter 28 by means of a multiplexing switch 36 and a summer 38. Timing and control signals are provided by a transmission controller 40 and are coupled therefrom by a multiplexing switch 42 to the sending stations 22. The receiver 34 is connected to the listening stations 26 by a multiplexing switch 44 with timing signals for the listening stations 26 being provided by a timer 46. In order that the timing signals provided for the reception of data by the timer 46 be synchronized with the timing signals provided by the controller 40, synchronization signals are provided at terminal S of the controller 40 and combined with the data signals by the summer 38, the synchronization signals being detected by a code detector 48 which detects the presence of the synchronization signals in the signal transmitted by the link 24 and applies the signals to the receiving timer 46.

Figure 4:
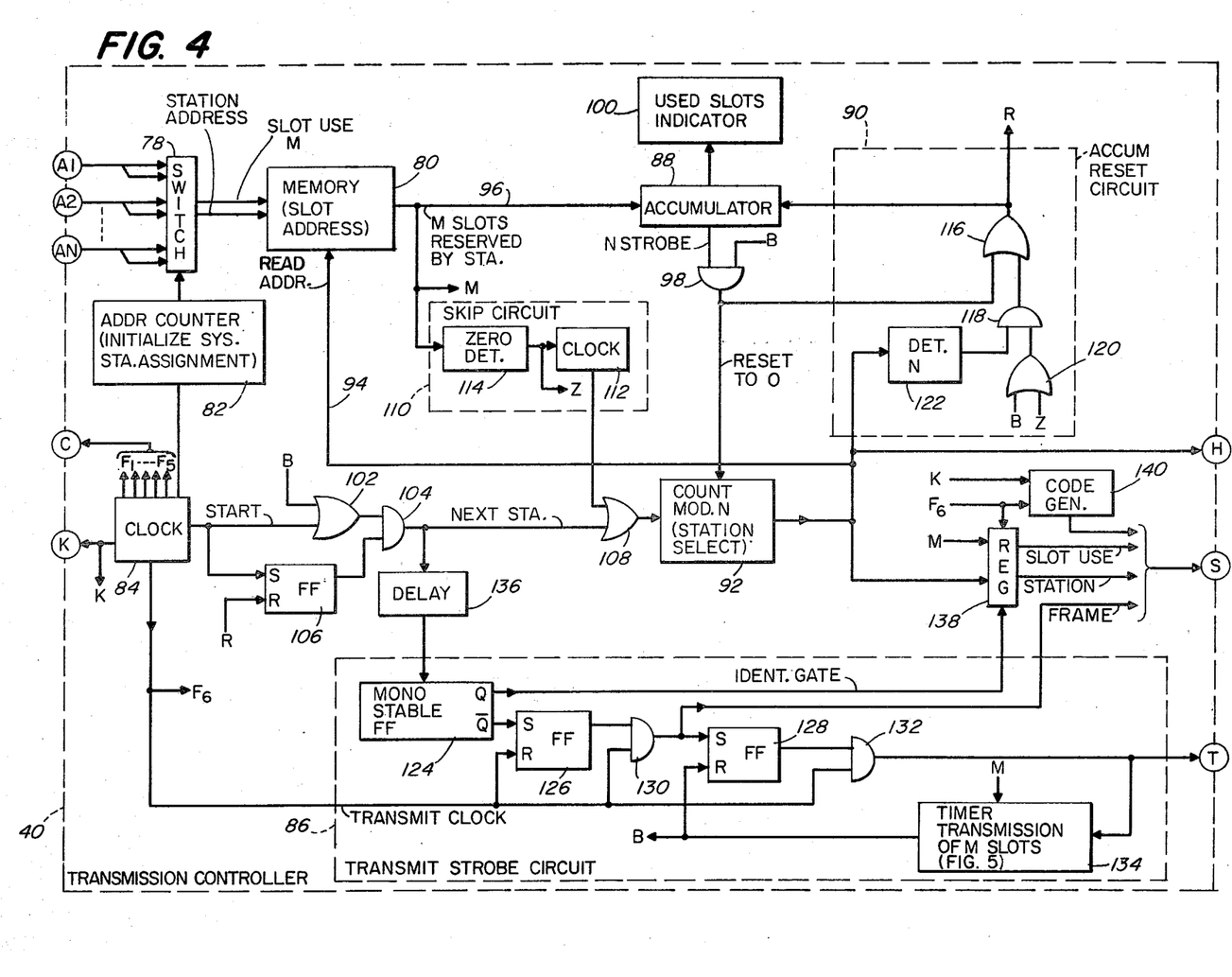
FIG. 4 is a block diagram of a transmission controller of FIG. 1.

In operation, data received by each sending station 22 is stored in a register, as will be described hereinafter with reference to FIG. 2, the data from each of the stations 22 being coupled sequentially by the multiplexing switch 36 to the transmitter 28. The controller 40, as will be described subsequently with reference to FIG. 4, provides at terminal H a station selection signal which activates the switch 36 for the sequential coupling of the stored data of the sending stations 22 to the transmitter 28. Similarly, the station selection signal at terminal H is also utilized for activating the multiplexing switch 42 for applying clock signals sequentially to each of the sending stations 22 having messages to be transmitted. Thereby, the transmission of these messages is accomplished at a clock rate which is much higher than the sampling rates of the messages employed by respective ones of the sending stations 22. The controller 40 includes a coding circuit for applying a code to the synchronization signals at terminals S to enable these signals to be identified in the presence of the data signals transmitted from the sending stations 22. The identification of the synchronization signals is accomplished by the aforementioned code detector 48. The construction and operation of the listening stations 26 parallels that of the sending stations 22, the timing of the respective operations also corresponding to the timing of operations of the sending station 22. The multiplexing switch 44 sequentially couples the listening stations 26 to the communication link 24 in a manner analogous to the coupling of the sending stations 22 by the multiplexing switch 36 to the communication link 24.

Figure 2:
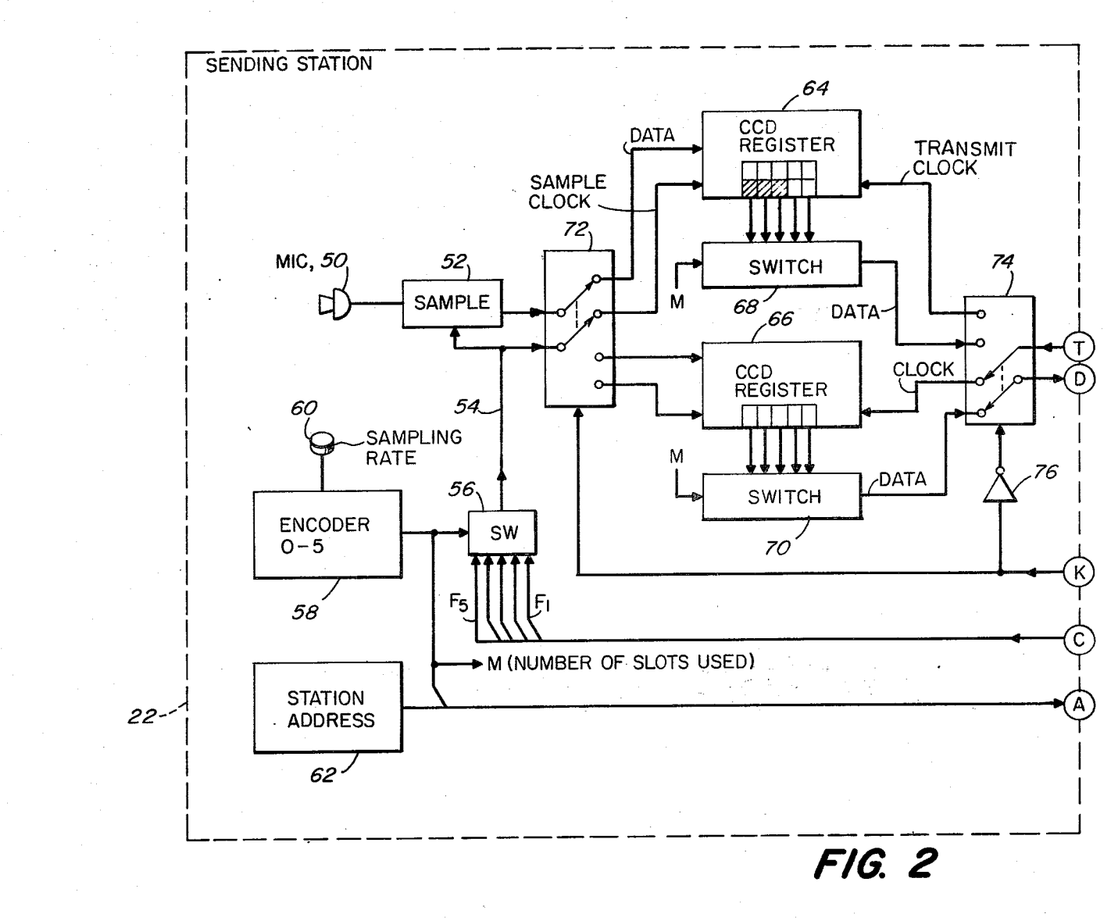
FIG. 2 is a block diagram of a sending station of FIG. 1.

Referring now to FIG. 2, there is seen a block diagram of a sending station 22. The sending station 22 is seen to comprise a microphone 50 which serves as a source of data of the message to be transmitted by the sending station 22. A sampler 52 samples signals of the microphone 50 in response to strobing signals on line 54 coupled from terminal C via a switch 56. By way of example, terminal C provides a set of five sampling frequencies F1–F5 for sampling the data selectively at any one of the five frequencies. For example, the five frequencies may be 100 Hertz (Hz), 200 Hz, 300 Hz, 400 Hz and 500 Hz. The selection of the sampling frequency is accomplished by means of an encoder 58 providing a digital signal for activating the switch 56, the digital signal being identified in the figure by the letter M and being selected by a knob 60 attached to the encoder 58. As will be seen subsequently, the legend M also identifies the number of slots of storage to be utilized by the sending station 22, the amount of storage being proportional to the sampling rate. Identification of a specific one of the sending stations 22 is provided by a station address unit 62, the station address and the signal M being seen fanning into the terminal A for use by the controller 40, as will be described subsequently, for synchronizing the operation of the sending stations 22 and the listening stations 26.

The sending station 22 further comprises a set of registers 64 and 66, switches 68 and 70 coupled respectively to the registers 64 and 66, switches 72 and 74 and an inverter 76. By way of example, the registers 64 and 66 are preferably built from charge coupled devices for storing analog samples of the data provided by the microphone 50. The use of a charge coupled device (CCD) provides for a smaller bandwidth of transmission than would be required, by way of example, by the delta modulation disclosed in the communication system of U.S. Pat. No. 3,750,024 which issued in the name of Dunn et al on July 31, 1973 for equal accuracy in the regeneration of the signal waveform.

As seen in FIG. 2, the CCD registers are drawn with five boxes which represent schematically five slots of storage within each of the registers 64 and 66. Each of the slots are understood to comprise a large number of cells, for example 100 cells, for the storage of a set of samples from the sampler 52. With reference to the preceding example of the five sampling frequencies, the first slot at the left end of the register, such as the register 64, would be utilized for sampling at the F1 frequency at 100 Hz. In the event that the F2 frequency of 200 Hz is to operate the sampler 52, then the first two slots of the register 64 would be utilized for storing the 200 samples of the message as provided by the sampler 52. The amount of slots to be utilized by each of the registers 64 and 66 is selected respectively by the switches 68 and 70 in accordance with the value of the M signal. Thus, when the M signal is set at a value of two by the encoder 58, the switch 56 selects the sampling frequency of 200 Hz and the switch 68 selects the first two slots of the register 64. As seen in the figure, data is coupled from the sampler 52 via the switch 72 into the register 64. Subsequently, the data is coupled out of the register 64 via the switch 74.

By way of example, let the value of M be equal to three, this corresponding to the pictorial representation of the darkened regions of the first three slots of the register 64 which represents schematically the utilization of the first three slots of the register 64 for storing samples of the message. Data is written into the register 64 via the switch 72, the clock pulses which strobe the sampler 52 serving also to strobe the register 64. A digital control signal having alternately a logic state of 0 and a logic state of 1, the logic state of 0 corresponding to a low voltage while the logic state of 1 corresponds to a relatively high voltage, is applied to the switches 72 and 74 for controlling the respective interconnections made by the switches 72 and 74. The inverter 76 inverts the digital signal appearing at terminal K so that the switch 74 is coupled to an output terminal of the register 66 while the switch 72 is coupled to an input terminal of the register 64. Upon reversal of the logic state of the signal at terminal K, the switch 72 couples data samples from the sampler 52 to the register 66 while the switch 74 is utilized for coupling data from the register 64 to the multiplexing switch 36 of FIG. 1. In this connection, it is noted that the labeling of the terminals of the sending station 22, namely terminal T, D, K, C and A corresponds to the same legends appearing in FIG. 1. Also, as noted in FIG. 1, the same legends appear in other units of the system to indicate the interconnection of the signals from one unit to the other.

In operation, therefore, and with respect to the foregoing example, data fed via the switch 72 into the input terminal of the register 64 is clocked through the register 64 during a data sampling interval of one second during which time 300 samples are stored in the first three slots of the register 64. During the next second of operation, the switch 74 is switched to the alternate position whereby data is coupled from the register 64 via the switch 68 to terminal D1 of the multiplexing switch 36 of FIG. 1 for the case where the data referred to relates to the first of the sending stations 22 of FIG. 1. For data provided by the second sending station 22 of FIG. 1, the data coupled via the switch 74 is coupled to terminal D2 of the switch 36. Since, in the foregoing example, the value of M is equal to three, the switch 68 couples data from the third slot of the register 64 to the switch 74. In this connection, it is noted that all data applied to the register 64 and subsequently coupled therefrom enter at a common input terminal of the register 64 and exit at a common output terminal of the register 64 to insure that all samples of the data experience equal amounts of attenuation in passing through the CCD register. Thereby, no modulation of the data occurs as has been noted earlier with reference to the Fisher patent. The clock rate of the clock pulse signal at terminal T utilized in the transmission of data from the registers 64 and 66 is at a rate much faster than that of the F1 sampling rate at terminal C, for example 1,000 times faster. Thus, for the foregoing example wherein F1 is at 100 Hz, the clock rate at terminal T is 100 kilohertz (kHz).

Figure 3:
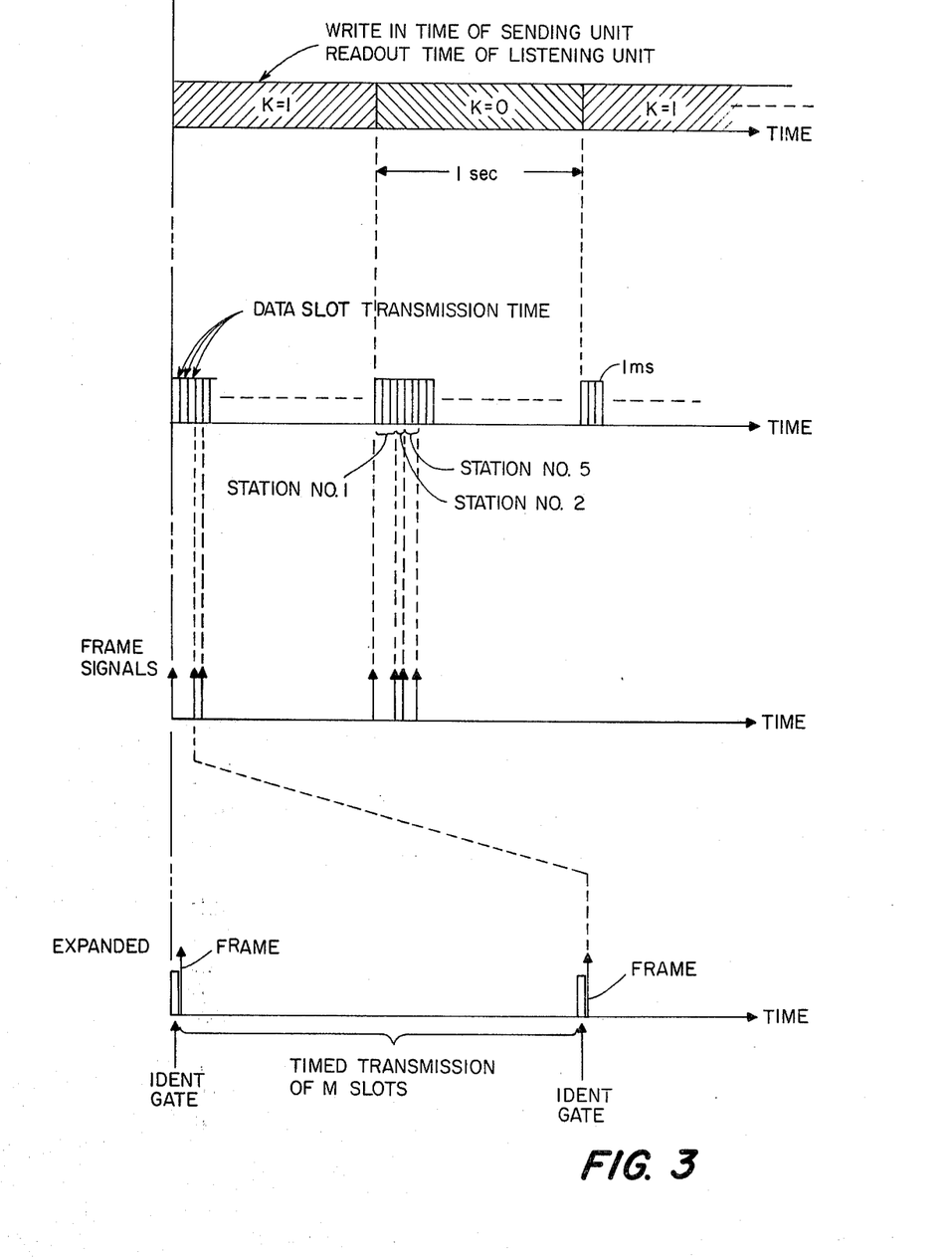
FIG. 3 is a timing diagram of the data storage and transmission of FIG. 1.

Referring now to FIG. 3, the timing diagram shows a set of four graphs. The first graph portrays the position of the switch 72 and the value of the K signal. In accordance with the foregoing example, the switch 72 remains in the position shown in FIG. 2 for a period of one second during which time the preselected number of slots of the register 64 are filled with data. During the next one second interval, identified in the first graph by the region K=0, the switch 72 is feeding data into the register 66. During each of these one second intervals a preset number of slots (one slot, two slots . . . five slots) of the register 64 or the register 66 are filled with data sampled corresponding to the selection of the sampling frequency by the switch 56 (F1, F2 . . . F5).

The second graph of the timing diagram of FIG. 3 shows the reading out of the data from the register 64 at the high data rate provided by the clock signal at terminal T. The reading-out rate is invariant as to the writing-in rate selected by the switch 56. Therefore, in the event that the F3 sampling rate is utilized for writing in data, three units of time are required for the reading out of data from the register 64. Similarly, if F2 is selected by the switch 56, in which case only two slots of the register 64 are filled within the one second interval of the first graph of FIG. 3, then only two units of time are utilized in the reading out of the data from the registers 64. This is demonstrated in the second graph of FIG. 3 which shows, by way of example, that three slots of data are read out of station #1, that only one slot of data is read out of station #2, that stations #3 and #4 are sending no data, and that station #5 is sending two slots of data. The third and fourth graphs of FIG. 3 relate to synchronization signals to be described subsequently with reference to the transmission controller 40 of FIG. 4.

Referring now to FIG. 4, the block diagram of the transmission controller 40 discloses a switch 78 and a memory 80. The switch 78 has input terminals connected respectively to the terminals A in each of the sending stations 22 for coupling signals therefrom to the memory 80, each signal comprising an identifying signal from the address unit 62 and the number of slots used, M, from the encoder 58 in the respective sending station 22. The switch 78 is activated by an address counter 82 which sequentially couples the switch 78 to each of the sending stations 22 for providing the slot use information to the memory 80. This information is utilized by the controller 40 for setting the time unit referred to in the second graph of FIG. 3 required for the reading out of data from each of the registers 64 and 66 of the respective sending stations 22.

In order to accommodate each of the sending stations 22, it is assumed by way of example, that each sending station 22 is to be allocated one slot for data transmission in each of its registers 64 and 66. Thereby, for a system 20 employing 800 sending stations 22, and the aforementioned exemplary output clock rate of 100 kHz, 0.8 seconds would be utilized for the transmission of the 800 slots of data wherein one slot is allocated for each of the 800 sending stations. This leaves 0.2 seconds for the transmission of synchronization signals to synchronize the listening stations 26 with the sending stations 22. A feature of the invention is the selected allocation of the slots among the various sending stations 22 so that, in the event that one of the sending stations 22 is not sending any data, then its slot may be utilized by another sending station 22 having data sampled at an exemplary 200 Hz sampling rate. Or, by way of example, in the event that there are four sending stations 22 not being utilized in the transmission of data, the four additional slots may be utilized by one of the sending stations 22 with an exemplary sampling rate of 500 Hz in which case five slots of data would be read out from the registers of that sending station 22. Thus, in the event that the tenth sending station 22 were utilizing all five slots in each of its registers, the multiplexing switch 42 of FIG. 1 would be coupling from its terminal T10 the 100 kHz transmission clock pulse signal to terminal T of the tenth sending station 22 during an interval of five milliseconds duration with one such five millisecond interval occurring during each one second interval of the first graph of FIG. 3. for the aforementioned example of a three-slot read-out interval for the first sending station 22 as noted in the second graph of FIG. 3, the three slots encompass a time duration of three milliseconds and are depicted periodically at one-second intervals on the second graph of FIG. 3. Similarly, with reference to the aforementioned portrayal of data of the second sending station 22 on the second graph of FIG. 3, the time allocated for the transmission of the one slot of data occupies one millisecond of transmission time.

With reference to FIG. 4, a clock 84 and a transmit strobe circuit 86 provides the aforementioned write-in sampling frequencies at F1–F5, the transmission clock frequency of terminal T, as well as the signal at terminal K for the operation of the switches 72 and 74 of FIG. 2. The write-in sampling frequencies F1–F5 are seen fanning together to be coupled via terminal C of the controller 40 and hence, as seen in FIG. 1, from terminal C of the transmission controller 40 to terminal C in each of the sending stations 22. Similar comments apply to the transmission of the switch control signal at terminal K of the transmission controller 40 to each of the sending stations 22. A 100 kHz clock signal, identified as F6 in FIG. 4, is applied by the clock 84 to the strobe circuit 86, the strobe circuit 86 utilizing the F6 signal to produce bursts of the clock pulse signal at terminal T in which a burst of 100 clock pulses is provided for a sending station 22 utilizing one slot, and a burst of, for example, 200 clock pulses, is utilized for the transmission of data from a sending station 22 utilizing two slots of its registers. As noted hereinabove, the transmit pulse signals of terminal T of the controller 40 are not coupled directly to each of the sending stations 22, but rather, are coupled via the multiplexing switch 42 sequentially to each of the sending stations 22. Thereby, the sending stations 22 are being activated one at a time by the read-out pulses at terminal T for transmission of data via the communication link 24 of FIG. 1.

The transmission controller 40 further comprises an accumulator 88, an accumulator reset circuit 90 and a counter 92. The counter 92 is utilized for providing a station address signal to the memory 80 via line 94. With reference to the foregoing example of 800 sending stations 22, the counter 92 counts modulo N where N equals 800. The counter 92 completes one complete cycle of its counting during each of the one-second intervals referred to previously in the graph of FIG. 3. In accordance with the address provided by line 94, the memory 80 provides on line 96 the number M of slots requested by each of the respective sending stations 22, the reservation of the M slots being accomplished as noted hereinbefore, by the encoder 58 in a sending station 22 as shown in FIG. 2. The accumulator 88 sums the successive values of M appearing on line 96 during each one-second interval of FIG. 3 and resets the counter 92 to zero in the event that the sum of all the M slots reaches the aforementioned exemplary value of 800 total available slots. The resetting of the counter 92 is accomplished by a strobe signal coupled from the accumulator 82 via an AND gate 98. The output terminal of the AND gate 98 is also coupled to the reset circuit 90 so that, upon the resetting of the counter 92, the accumulator 88 is also reset to 0. An indicator 100 is coupled to the accumulator 88 for displaying the total amount of slots reserved so that users of the sending stations 22 will know when the system capacity of the system 20 in terms of total available slots is being approached.

Initiation of the counting of the counter 92 is accomplished by a start pulse signal from the clock 84 which is coupled via an OR gate 102, and AND gate 104, a flip-flop 106 and an OR gate 108. The flip-flop 106 is set by a start signal of the clock 84 and reset by a reset signal at terminal R of the reset circuit 90. The setting of the flip-flop 106 enables the AND gate 104 to pass a pulse from the OR gate 102 to the OR gate 108 by which it is coupled to the counter 92 whereupon the counter counts from its reset condition of 0 to a count of 1. Thereby the address of the first sending station of FIG. 1 is addressed in the memory 80. Subsequent clock pulses for clocking the counter 92 are obtained from terminal B of the strobe circuit 86 in a manner to be described. The pulses at terminal B occur subsequent to the transmission of data from each of the sending stations 22 whereupon the counter 92 advances the address on line 94 to the next sending station 22. In the event that a sending station is not being utilized for the transmission of data, the encoder 58 of FIG. 2 is set of a value of M equals 0 in which case no slots are reserved for the transmission of data from that sending station 22.

A skip circuit 110 provides clock pulses via the OR gate 108 to the counter 92 for those situations wherein the memory 80 reads out a value of M equal to 0 for a sending station 22 not being utilized. In the event that a sending station 22 is not being utilized, then no clock pulse appears at terminal B at the input of the OR gate 102. In order to advance the count of the counter 92 past the addresses of the sending stations 22 not being utilized, a clock 112 of the skip circuit 110 provides clock pulses via the OR gate 108 to the counter 92. A zero detector 114 of the skip circuit 110 detects a zero from the memory 80 on line 96 and, in response thereto, provides a signal at terminal Z of the skip circuit 110 and also triggers the clock 112 to provide a sequence of clock pulses which continually increases the value of the count of the counter 92 until the memory 80 shows a non-zero value on line 96. In this way, the counter 92 sequentially addresses all the information of the sending stations in the memory 80.

The accumulator reset circuit 90 comprises an OR gate 116, an AND gate 118, an OR gate 120 and a detector 122 of the number N of the sending stations which is equal in the foregoing example to 800. The detector 122 is coupled via line 94 to the counter 92. The output terminal of the OR gate 116 is coupled to the reset terminal of the accumulator 88 and to the aforementioned terminal R of the reset circuit 90. When the detector 122 detects the aforementioned value of 800, it enables the AND gate 118 to reset the accumulator 88 upon the completion of the transmission of a slot of data as described previously with reference to FIG. 3. The conclusion of the transmission of data by the eight-hundredth sending station 22 is indicated by the appearance of the clock pulse at terminal B at the strobe circuit 86, the terminal B being coupled via the OR gate 120 through the AND gate 118 to accomplish the aforementioned resetting. Alternatively, in the event that the eight-hundredth sending station 22 is not being utilized for the transmission of data, in which case N=0 on line 96, then a pulse at terminal Z of the skip circuit 110 is coupled via the OR gate 120 to the AND gate 118 for resetting the accumulator 88. And, as noted hereinabove, in the event that many of the sending stations 22 are utilizing more than one slot of data, then a count of 800 may never be reached by the counter 92 since the accumulator would have reset the counter 92 to 0 via the AND gate 98.

The strobe circuit 86 comprises a monostable flip flop 124, two flip flops 126 and 128, two AND gates 130 and 132 and a timer 134 which will be described in further detail with reference to FIG. 5. The clock pulse signal for the counter 92 provided by the AND gate 104 is coupled via a delay unit 136 to the flip-flop 124. The delay of the delay unit 136 is equal to the time required for the counter 92 to advance to the next address and for the data corresponding to that address to appear on line 96 from the memory 80. The signal at the input terminal of the delay unit 136 signifies the commencement of the reading-out process of data from the next sending station. Accordingly, upon the triggering of the flip-flop 124 by the clock pulse signals from the delay unit 136, the Q output terminal of the flip-flop 124 activates a register 138 to read out synchronization data, in a manner to be described subsequently, for the synchronization of the listening stations to the sending stations. After the synchronization data has been transmitted, the flip-flop 124 reverts to its original state at which time the Q bar terminal sets the flip-flop 126 which, in turn, enables the AND gate 130. Upon the enabling of the AND gate 130, the next F6 clock pulse from the clock 84 is coupled via the AND gate 130 to the flip-flop 128 and also serves as a synchronization signal on the frame line for terminal S. The F6 clock pulse also resets the flip-flop 126 so that no further pulse signals appear at the output terminal of the AND gate 130 during the reading out of data from a specific sending station 22. The setting of the flip-flop 128 enables the AND gate 132 to pass a series of F6 clock pulses which appear at terminal T for the coupling of data from the sending station 22 of FIG. 1. The timer 134, in response to the value of M on line 96 from the memory 80 and in response to each of the clock pulses appearing at terminal T, counts the requisite number of clock pulses required to read out the data of a specific one of the sending stations 22 in accordance with the number of slots reserved by that station, and signifies by the generation of a pulse at terminal B the conclusion of the data read-out period for that sending station.

The value of M of line 96 is also coupled to the register 138 as is the value of the count of the counter 92 on line 94. In addition, the value of K from the clock 84 is applied to a code generator 140 which, in response to F6 clock pulses coupled thereto, produces a code word designating the beginning of a logic state of 1 for the K signal. This code word is coupled via terminal S to the summer 38 of FIG. 1. The F6 clock pulses are also coupled to the register 138 for serially reading out the value of M and the address on line 94, these representing respectively the slot use and station address which are coupled via terminal S to the summer 38 of FIG. 1 for subsequent transmission via the communication link 24 for synchronization of the listening stations 26 with the sending stations 22. In view of the complementary values of the Q and Q̄ signals of the flip-flop 124, it is seen that the slot use and stations identification data transmitted from the register 138 is transmitted between the intervals of time utilized for the data transmission.

A frame signal produced at the output terminal of the AND gate 130 synchronizes the listening stations 26 to be ready to except the sequence of clock pulses produced at terminal T of the receiving timer 46 of FIG. 1 in a manner to be described. It is noted that the clock pulses produced at terminal T of the receiving timer 46 correspond to the series of clock pulses produced at terminal T of the controller 40. However, in lieu of transmitting each of these clock pulses via the communication link 24, it suffices to transmit only the frame synchronization signal via terminal S. While the frame synchronization signal is transmitted once for each reading out of data from each of the sending stations 22 transmitting data, the code from the code generator 140 is transmitted only once during every two second interval of FIG. 3, that being the instant when the value of K assumes a logic state of 1. Clock pulse signals from the clock 84 to the counter 82 may be sent at even less frequent intervals, for example, a series of clock pulses may be transmitted from the clock 84 to the counter 82 once every half minute to interogate the sending stations 22 to determine what number of slots is being reserved by each of the sending stations 22.

The address signal on line 94 from the counter 92 is also coupled to terminal H of the controller 40 from which, as seen in FIG. 1, the signal is coupled to terminal H of the multiplexing switches 36 and 42. Thereby, with each addressing of the memory 80 by the counter 92 in accordance with a specific one of the sending stations 22, the switches 36 and 42 of FIG. 1 are correspondingly activated to couple the transmit clock pulses of terminal T to that sending station, and the output data of that sending station is coupled to the summer 38 for transmission via the transmitter 28.

Figure 5:
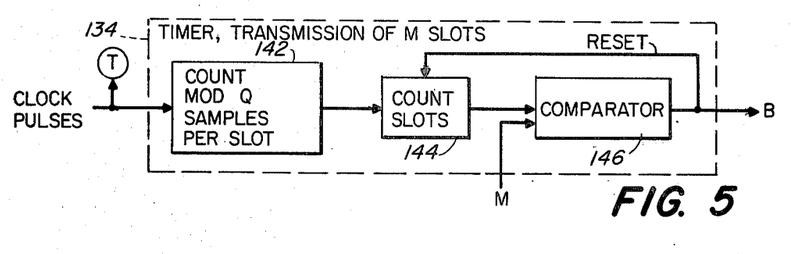
FIG. 5 is a block diagram of a transmission timer of FIG. 4.

Referring now to FIG. 5, the timer 134 is seen to comprise a counter 142, a counter 144 and a comparator 146. The counter 142 counts clock pulses present at the output terminal of the AND gate 132 of FIG. 4 and at terminal T, the counter 142 counting the clock pulses modulo Q where Q is the number of samples stored per slot of the register 64 of FIG. 2. With reference to the aforementioned example, Q equals 100. Upon counting the 100 clock pulses, the counter 142 resets itself to zero and strobes the counter 144. Thus, each strobing of the counter 144 represents the time duration allotted for the transmission of one slot of data from the register 64 of FIG. 2. Again, with reference to the aforementioned example, the clock pulses at terminal T occur at a 100 kHz rate so that the strobe signal applied to the counter 144 represents an elapsed time of one millisecond as well as the conclusion of one slot of data transmission. The count of the counter 144 is compared by the comparator 146 to the value of M, the number of slots reserved by a particular sending station 22 of FIG. 1, the comparator 146 providing a pulse signal at terminal B when the count of the counter 144 equals the value of M. The pulse provided by the comparator 146 is also coupled to the reset terminal of the counter 144 for resetting the counter 144 to zero. Thereby, the timer 134 provides the aforementioned signal at terminal B designating the conclusion of the transmission interval of a sending station 22.

Figure 6:
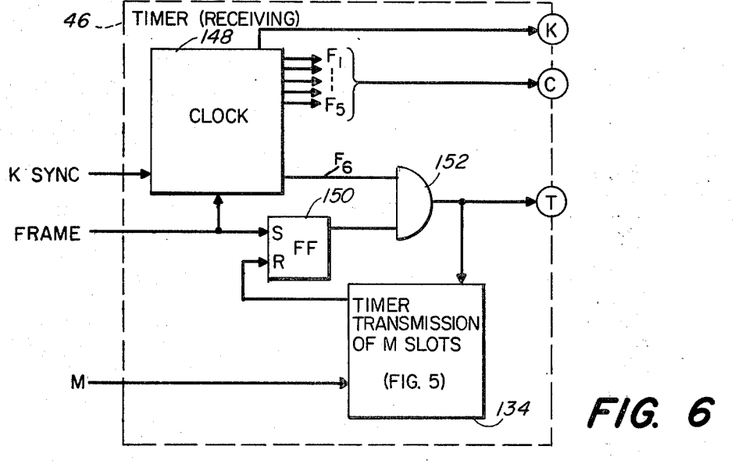
FIG. 6 is a block diagram of a receiving timer of FIG. 1.

Referring now to FIG. 6, there is presented a diagram of the timer 46 of FIG. 1 which generates the timing signals for receiving the message. The timer 46 is seen to comprise a clock 148 which provides the timing signals F1–F6 as does the timer 84 of FIG. 4, a flip-flop 150, an AND gate 152 and a timer 134 which is shown in FIG. 5. The frame signal of FIG. 4, transmitted by the communication link 24 and detected by the detector 48 of FIG. 1, is applied to the clock 148 for synchronizing its timing signals to the corresponding timing signals of the clock 84 of FIG. 4, the frame signal also setting the flip-flop 150. The setting of the flip-flop 150 enables the AND gate 152 to couple the F6 clock pulses of the timer 148 to terminal T of the timer 46, the occurrences of sequences of clock pulses at terminal T being identical to the occurrence of corresponding sequences of clock pulses at terminal T of the controller 40 of FIGS. 1 and 4. The timer 134 counts the clock pulses at terminal T of the timer 46 and resets the flip-flop 150 upon the conclusion of the transmission interval of the sending station 22 of FIG. 1. Thereupon, no further clock pulses appear at terminal T until the appearance of the frame signal for the transmission of data from the next sending station 22. Thus, the operation of the timer 134 in FIG. 6 parallels the operation of the timer 134 in FIG. 4 for designating the length of the burst of clock pulses utilized in the transmission of data from a sending station 22.

With reference to FIGS. 1, 3, 4 and 6, the operation of the frame signal and the identification gate signal of FIG. 4 is further described. The third graph of FIG. 3 shows, by way of example, several frame signals each of which occurs at the beginning of a transmission of data from a sending unit 22 of FIG. 1. The set of assigned slots for each sending unit 22 constitutes the frame assigned for the transmission of the data. The fourth graph of FIG. 3 shows an expanded scale of the third graph of FIG. 3 wherein an interval of time, much shorter than the frame interval, is set aside for the identification gate signal of FIG. 4. The interval of time represented by the identification gate is set aside for the transmission of the synchronization signals at terminal S of the controller 40 and, as seen in the fourth graph of FIG. 3, an identification gate precedes each frame signal. This relationship between the identification gate and the frame signal corresponds to that previously taught with reference to FIG. 4 wherein it was shown that the two signals are related respectively by the complementary states at the output terminals of the flip-flop 124. As was noted earlier, with reference to FIG. 1, the synchronization signals at terminal S are summed with the data signals from the switch 36 by the summer 38 for the transmission via the communication link 24. It is now further seen that, with reference to the fourth graph of FIG. 3, the synchronization signals of terminal S are time multiplexed with the data signal, the synchronization signals preceding each frame of data and serving to identify the specific sending station 22 and the number of slots allocated to that sending station 22. The code detector 48 of FIG. 1 decodes the code word of the generator 140 to produce the K sync signal of FIG. 1 which synchronizes the clock 148 of the receiving timer 46 with the clock 84 of the transmission controller 40. The detector 48 includes a holding circuit (not shown in the figures) which retains the value of the station identification signal (H) and the slot use signal (M) between frame signals. The station identification signal, which identifies a specific one of the sending stations 22, is coupled to terminal H of the multiplexing switch 44 to select the corresponding listening station 26. The slot use signal is also coupled to terminal M of the switch 44 for use by the listening stations 26 as will now be described.

Figure 7:
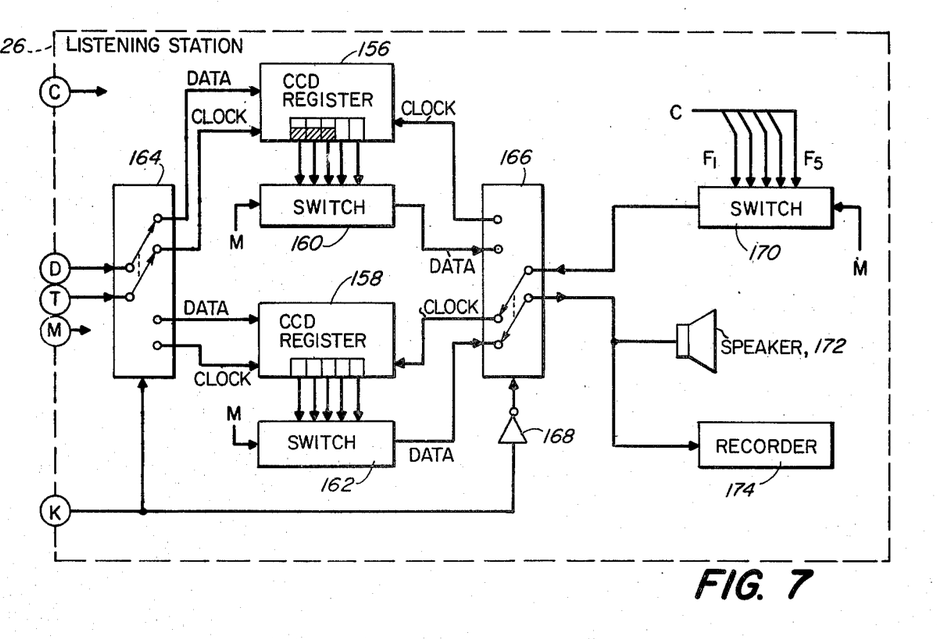
FIG. 7 is a block diagram of a listening station of FIG. 1.

Referring now to FIG. 7, a listening station 26 of FIG. 1 comprises registers 156 and 158 which are of the same form as the registers 64 and 66 disclosed previously with reference to FIG. 2, switches 160 and 162 which function in a manner analogous to that disclosed with reference to switches 68 and 70 of FIG. 2, switches 164 and 166 which operate in a manner analogous to that disclosed with reference to the switches 72 and 74 of FIG. 2, a digital inverter 168, a switch 170, a speaker 172 for listening to the voice message of the microphone 50 of FIG. 2 and a recorder 174 for recording the message. The switches 164 and 166 are driven by the signal at terminal K to the same switch positions as the corresponding switches 72 and 74 of FIG. 2, the inverter 168 serving to reverse the position of the switch 166 in the same manner as was described previously with reference to the inverter 76 of FIG. 2. As noted hereinabove, the K signal is coupled from the timer 46 via the multiplexing switch 44 to each of the listening stations 26, the K signal of the timer 46 being synchronized to the K signal of the controller 40 by the code generator 140 of FIG. 4, and the code detector 48 of FIG. 1.

The switches 160, 162 and 170 are each controlled by the M signal which is coupled sequentially to each of the listening stations 26 by the multiplexing switch 44 of FIG. 1, the M signal being applied to the multiplexing switch 44 by the code detector 48. The data is written into the registers 156 and 158 alternately in accordance with the position of the switch 164, the writing in of the data being governed by the clock pulses at terminal T. The data is coupled to the registers 156 and 158 via terminal D from the multiplexing switch 44 of FIG. 1. The timing signals of terminal C are continuously coupled to each of the listening stations 26 from the timer 46 as seen in FIG. 1, the timing signals at terminal C having the sampling frequencies F1–F5 of which one of these sampling frequencies is selected by the switch 170 in accordance with the value of M. The clock pulse signals supplied by the switch 170 are utilized for reading out of the registers 158 and 156 in accordance with the position of the switch 166 at the same data rate which was utilized in sampling the data from the microphone 50 of the corresponding sending station 22 as shown in FIGS. 1 and 2. By way of example, the sampling rate utilized in FIG. 7 is the F3, or 300 Hz, sampling rate and, accordingly, three slots of the register 156 are shown darkened to indicate the data stored therein as was shown in the description of the sending station 22 of FIG. 2. The data is coupled out from the third slot of the register 156 by the switch 160, and also from the third slot of the register 158 by the switch 162 to appear at the speaker 172 and the recorder 174.

It is also noted that in the event that the foregoing example of 800 stations were reduced to, for example, eight stations, then the total elapsed transmission time for the transmission of one slot per station would be eight milliseconds. The eight millisecond interval of time is less than the period between pulses of the F1 data sampling signal. Accordingly, in the situation where there are only eight sending stations and eight listening stations, one register such as the register 64 of FIG. 2 and one register such as the register 156 of FIG. 7 would suffice respectively for each of the sending stations 22 and listening stations 26 of FIG. 1. The double buffer storage arrangement provided by the use of pairs of registers in each of the sending and listening stations would not be required since there would be adequate time, on the average, between the data samples for the transmission of the data at the F6 clock rate by the communication link 24.

It is understood that the above-described embodiment of the invention is illustrative only and that modifications thereof may occur to those skilled in the art. Accordingly, it is desired that this invention is not to be limited to the embodiments disclosed herein but is to be limited only as defined by the appended claims.

What is claimed is:

1. A communication system for selectively transmitting data from a set of sending stations over a common communication link to a set of listening stations, the system comprising:
  a register means located in each of said sending stations for the storage of samples of data to be transmitted by said system;
  each of said register means having slots serially connected for the storage of data, there being terminals coupled to respective ones of the slots;
  each of said sending stations further comprising switching means coupled to said register means for selecting a pair of terminals of said register means, one of said terminals being a data input terminal and the other of said terminals being a data output terminal, the slots coupled between said input and said output terminals being designated for data storage, all data of said sending stations being coupled via said output data terminal to said common communication link; and wherein
  each of said listening stations comprises a corresponding register means and a corresponding switching means coupling said register means to said communication link.

2. A system according to claim 1 further comprising means within a sending station for sampling data, means coupled to said sampling means for varying a sampling rate thereof, and wherein said switching means is coupled to said rate varying means for selecting a terminal of said pair of terminals for designating an amount of storage in accordance with the magnitude of said sampling rate.

3. A system according to claim 2 further comprising means for reading out data from said register at a rate independent of said sampling rate, said reading out means including means for varying an interval of time of reading out said data in accordance with the magnitude of said sampling rate.

4. A system according to claim 3 further comprising means coupled to said communication link for addressing listening stations of said set of listening stations during intervals of time between the reading out of data of one of said sending stations and the reading out of data of a second of said sending stations.

5. A communication system for selectively transmitting data from a set of sending stations over a common communication link to a set of listening stations, the system comprising:
  a register means located in each of said sending stations for the storage of samples of data to be transmitted by said system;
  each of said sending stations further comprising switching means coupled to said register means for selecting a pair of terminals of said register means, one of said terminals being a data input terminal and the other of said terminals being a data output terminal, all data of said sending station being coupled via said output data terminal to said common communication link;
  each of said listening stations comprising a corresponding register means and a corresponding switching means coupling said register means to said communication link;

means within a sending station for sampling data, means coupled to said sampling means for varying a sampling rate thereof, said switching means being coupled to said rate varying means for selecting a terminal of said pair of terminals for designating an amount of data storage in accordance with the magnitude of said sampling rate;

means for reading out data from said register at a rate independent of said sampling rate, said reading out means including means for varying an interval of time of reading out said data in accordance with the magnitude of said sampling rate;

means coupled to said communication link for addressing listening stations of said set of listening stations during intervals of time between the reading out of data of one of said sending stations and the reading out of data of a second of said sending stations; and wherein said rate varying means includes means for reserving a number of data slots for transmission of data from a sending station of said set of sending stations, said system further comprising means coupled to said slot reserving means for storing information of assigned slots, said interval varying means of said reading out means scanning said means for the storing of said slot assignments to accomplish said varying of said intervals of time of reading out data in accordance with the assigned slots.

6. A system according to claim 5 further comprising means for transmitting said slot assignment information during intervals of time between said reading out of data to said set of listening stations.

7. A communication system for selectively transmitting data from a set of sending stations over a common communication link to a set of listening stations, the system comprising:

register means located in each of said sending stations for the storage of samples of data to be transmitted by said system;

each of said register means having slots serially connected for the storage of data, there being terminals coupled to respective ones of said slots;

each of said sending stations further comprising switching means coupled to said register means for selecting a pair of terminals of said register means, one of said terminals being a data input terminal and the other of said terminals being a data output terminal, the slots coupled between said input and said output terminals being designated for data storage, all data of said sending stations being coupled via said output data terminal to said common communication link;

each of said listening stations comprising a corresponding register means and a corresponding switching means coupling said register means to said communication link;

means within a sending station for sampling data, means coupled to said sampling means for varying a sampling rate thereof, said switching means being coupled to said rate varying means for selecting a terminal of said pair of terminals for designating an amount of data storage in accordance with the magnitude of said sampling rate; and wherein said rate varying means includes means for reserving a number of data slots for transmission of data from a sending station of said set of sending stations, said system further comprising means coupled to said slot reserving means for storing information of the assigned slots, said interval varying means of said reading out means scanning said means for the storing of said slot assignments to accomplish said varying of said intervals of time of reading out data in accordance with the assigned slots.

* * * * *